US008396850B2

(12) United States Patent  
Schneider

(10) Patent No.: US 8,396,850 B2
(45) Date of Patent: Mar. 12, 2013

(54) DISCRIMINATING SEARCH RESULTS BY PHRASE ANALYSIS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 442 days.

(21) Appl. No.: 12/395,507

(22) Filed: Feb. 27, 2009

(65) Prior Publication Data

US 2010/0223273 A1 Sep. 2, 2010

(51) Int. Cl.
G06F 7/00 (2006.01)
G06F 17/30 (2006.01)

(52) U.S. Cl. ........................................ 707/706
(58) Field of Classification Search .................. 707/706, 707/999.002
See application file for complete search history.

(56) References Cited

U.S. PATENT DOCUMENTS

| | | | |
|---|---|---|---|
| 5,796,356 A | 8/1998 | Okada et al. | |
| 5,801,648 A | 9/1998 | Satoh et al. | |
| 5,844,508 A | 12/1998 | Murashita et al. | |
| 5,848,198 A | 12/1998 | Penn | |
| 5,907,637 A | 5/1999 | Murashita et al. | |
| 6,026,198 A | 2/2000 | Okada | |
| 6,061,398 A | 5/2000 | Satoh et al. | |
| 6,738,759 B1 | 5/2004 | Wheeler et al. | |
| 7,124,149 B2 | 10/2006 | Smith et al. | |
| 7,593,932 B2* | 9/2009 | Lindh et al. ........................ | 1/1 |
| 7,831,559 B1* | 11/2010 | Mohan et al. ................. | 707/638 |
| 2002/0065857 A1* | 5/2002 | Michalewicz et al. ........ | 707/532 |
| 2002/0094080 A1 | 7/2002 | Duan et al. | |
| 2003/0012400 A1 | 1/2003 | McAuliffe et al. | |
| 2003/0033288 A1 | 2/2003 | Shanahan et al. | |
| 2003/0061200 A1 | 3/2003 | Hubert et al. | |
| 2003/0101164 A1 | 5/2003 | Pic et al. | |
| 2003/0154071 A1* | 8/2003 | Shreve ............................. | 704/9 |
| 2003/0200505 A1 | 10/2003 | Evans | |
| 2004/0064438 A1* | 4/2004 | Kostoff ............................ | 707/1 |
| 2005/0086224 A1 | 4/2005 | Franciosa et al. | |
| 2005/0102614 A1* | 5/2005 | Brockett et al. .............. | 715/513 |
| 2005/0108001 A1 | 5/2005 | Aarskog | |
| 2006/0015486 A1 | 1/2006 | Nomiyama et al. | |
| 2006/0089924 A1* | 4/2006 | Raskutti et al. .................. | 707/1 |
| 2006/0235687 A1 | 10/2006 | Carus et al. | |
| 2007/0061320 A1* | 3/2007 | Surendran ........................ | 707/5 |
| 2007/0061348 A1* | 3/2007 | Holland et al. ............... | 707/100 |
| 2007/0206884 A1 | 9/2007 | Kato | |
| 2007/0233477 A1 | 10/2007 | Halowani et al. | |
| 2008/0005651 A1 | 1/2008 | Grefenstette et al. | |
| 2008/0052273 A1* | 2/2008 | Pickens ............................ | 707/3 |
| 2008/0082531 A1* | 4/2008 | Suarez ............................. | 707/7 |
| 2008/0114750 A1 | 5/2008 | Saxena et al. | |

(Continued)

OTHER PUBLICATIONS

Hua-Jun Zeng, Qi-Cai He, Zheng Chen, Wei-Ying Ma, Jinwen Ma, "Learning to Cluster Web Search Results", ACM, Jul. 25-29, 2004, 8 pgs.

(Continued)

*Primary Examiner* — Robert Beausoliel, Jr.
*Assistant Examiner* — Nicholas Allen
(74) *Attorney, Agent, or Firm* — Lowenstein Sandler LLP

(57) ABSTRACT

A statistical analysis parses documents for phrases in the documents. Each document is analyzed with a phrase analysis engine to determine a key phrase that frequently occur throughout each document. One or more documents are grouped together based a corresponding statistically improbable phrase.

20 Claims, 6 Drawing Sheets

U.S. PATENT DOCUMENTS

| | | | |
|---|---|---|---|
| 2008/0162455 | A1 | 7/2008 | Daga et al. |
| 2008/0162456 | A1 | 7/2008 | Daga et al. |
| 2008/0270119 | A1* | 10/2008 | Suzuki .............................. 704/9 |
| 2009/0030671 | A1 | 1/2009 | Kwon et al. |
| 2009/0055380 | A1* | 2/2009 | Peng et al. ........................ 707/5 |
| 2009/0125805 | A1 | 5/2009 | Ananthanarayanan et al. |
| 2010/0005087 | A1* | 1/2010 | Basco et al. ....................... 707/5 |
| 2010/0027051 | A1* | 2/2010 | Hamilton et al. ............. 358/1.15 |
| 2010/0131569 | A1 | 5/2010 | Jamison et al. |
| 2011/0320453 | A1* | 12/2011 | Gallivan et al. ............... 707/738 |

OTHER PUBLICATIONS

Red Hat Office Action for U.S. Appl. No. 12/395,341 mailed Jul. 6, 2011.
Red Hat Final Office Action for U.S. Appl. No. 12/395,319 mailed Aug. 15, 2011.
Red Hat Office Action for U.S. Appl. No. 12/395,319 mailed Mar. 24, 2011.
USPTO, Final Office Action for U.S. Appl. No. 12/395,341 mailed Dec. 7, 2011.
USPTO, Office Action for U.S. Appl. No. 12/395,319 mailed Jun. 4, 2012.
USPTO, Advisory Action for U.S. Appl. No. 12/395,319 mailed Oct. 27, 2011.
USPTO, Advisory Action for U.S. Appl. No. 12/395,341 mailed Feb. 6, 2012.
USPTO, Office Action for U.S. Appl. No. 12/395,341 mailed May 23, 2012.

* cited by examiner

DISCRIMINATING SEARCH RESULTS BY PHRASE ANALYSIS

RELATED APPLICATIONS

The present application is related to co-pending U.S. patent application Ser. No. 12/395,319, filed Feb. 27, 2009, entitled "Preprocessing Text to Enhance Statistical Features," and co-pending U.S. patent application Ser. No. 12/395,341, filed Feb. 27, 2009, entitled "Measuring Contextual Similarity".

TECHNICAL FIELD

Embodiments of the present invention relate to computing systems, and more particularly, to a method and apparatus for analyzing and searching documents.

BACKGROUND

Existing search engines often return a long list of search results, ranked by their relevancies to the given query. Web users have to go through the list and examine the titles and the corresponding sample quotation to identify the results. This can be time consuming when multiple subtopics of the given query are mixed together.

Several previous solutions suggest clustering search results into different groups. However such traditional clustering techniques are inadequate since they do not generate clusters with highly readable names. Another previous solution utilizes a regression model learned from human label training data. Such data would first have to be built and accumulated to be accurate.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for analyzing documents. A statistical analysis parses documents for phrases in the documents. Each document is analyzed with a phrase analysis engine to determine a key phrase that frequently occurs throughout each document. One or more documents are grouped together based on a corresponding statistically improbable phrase.

Figure 1A:
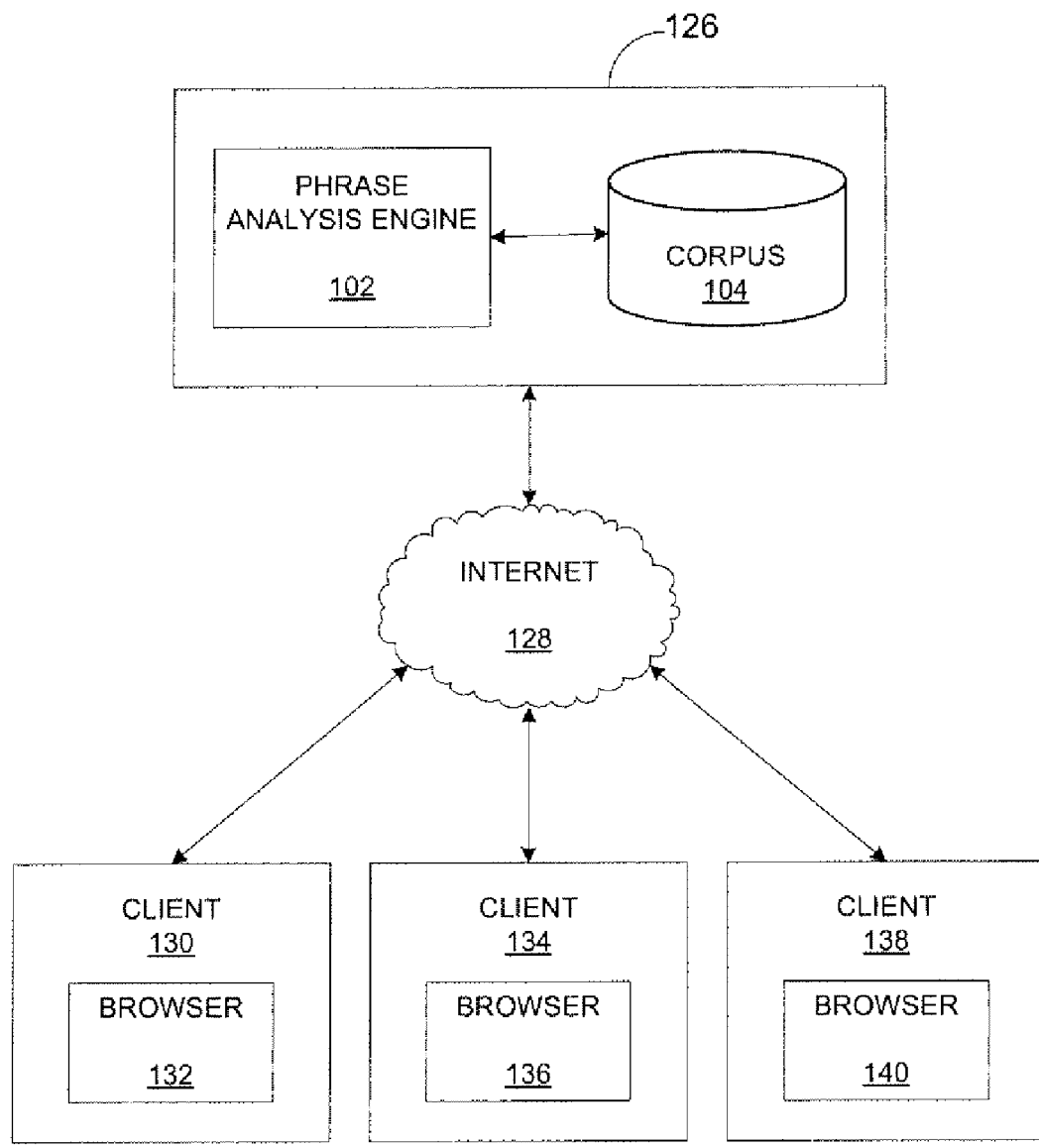
FIG. 1 is a block diagram illustrating one embodiment of a system for analyzing documents.

FIG. 1A is a block diagram illustrating one embodiment of a system for analyzing phrases from a set of documents. One or more clients 130, 134, 138 communicate with a server 126 via a network 128 such as the Internet. In one embodiment, clients 130, 134, 138 respectively communicate with server 126 via browsers 132, 136, and 140.

Server 126 includes a phrase analysis engine 102 coupled to a storage device 104 including a corpus of documents.

Figure 1B:
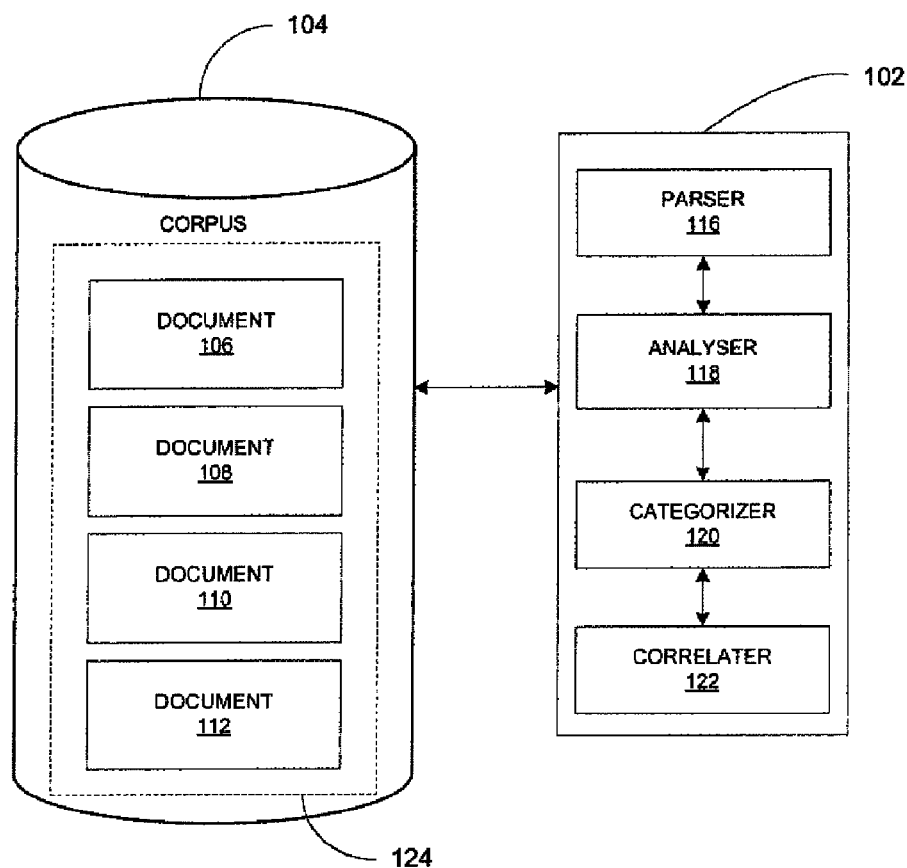

FIG. 1B is a block diagram of one embodiment of a phrase analysis engine 102. Phrase analysis engine 102 includes a parser module 116, an analyzer module 118, a categorizer module 120, and a correlater module 122. A storage device 104 stores documents 106, 108, 110, and 112 forming a corpus 124. Corpus 124 can include text and/or graphics documents. For example, a document may be a book, a report, a paper, or any document that is at least partially-text based.

Parser 116 is configured to parse all documents in corpus 124 for the phrases (for example, two to ten words). Analyzer 118 is configured to analyze each document with a phrase analysis engine to determine a key phrase that frequently occurs throughout each document. In another embodiment, analyzer 118 also performs a statistical analysis to determine a frequency of occurrence of a phrase in a document relative to the set of documents. Documents with a lower probability of occurrence of the phrase relative to corpus 124 are associated with the phrase. In one embodiment, a key phrase having a low probability of occurrence in the corpus is also referred to as statistically improbable phrases ("SIPs").

To identify SIPs, parser 116 scans the text of all documents in corpus 124. If analyzer 118 finds a phrase that occurs a large number of times in a particular document relative to all documents in corpus 124, that phrase is a SIP in that particular document. SIPs are not necessarily improbable within a particular document, but they are improbable relative to all documents in corpus 124. For example, most SIPs for a document on cat are feline related. But because SIPs may be displayed in order of their improbability score, the first SIPs will be on feline topics that the document mentions more often than other feline-related books.

Categorizer 120 is configured to group documents together based on a corresponding statistically improbable phrase. In one embodiment, documents are sorted into categories based on common SIPs with documents that share more SIPs being more tightly coupled (to the point that some of the results may wind up suppressed as being duplicates).

Correlater 122 is configured to correlate search query phrases associated with one or more documents within a group. For example, some documents in a collection about cats of the genus Panthera may have the phrase "family Felidae" while other documents may have "Pantherinae subfamily." This correlation may be strong enough that other documents with the SIP "family Felidae" are categorized with documents with the SIP "Pantherinae subfamily," even if they don't contain the latter SIP. This particular correlation may not be evident from the result set alone, but may require a larger corpus of analyzed documents.

Figure 2:
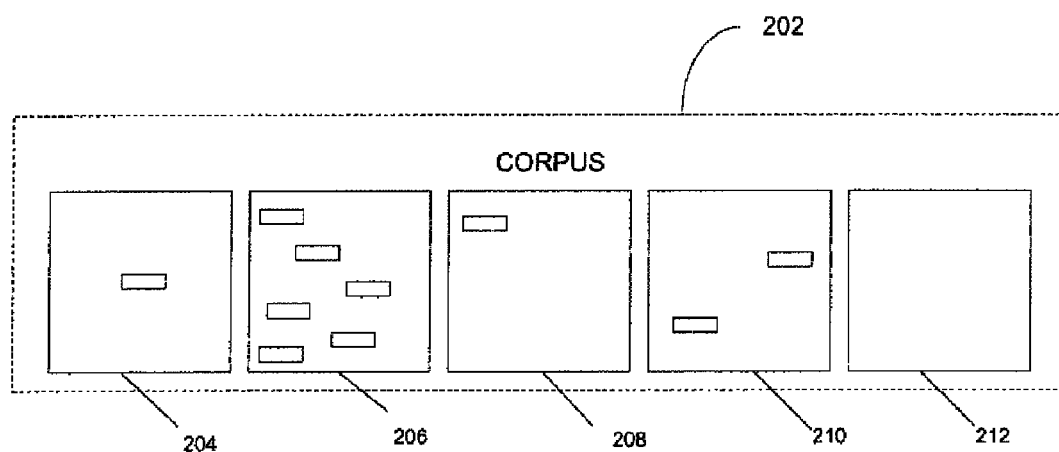
FIG. 2 is a block diagram illustrating one embodiment of a corpus analyzed by the system of FIG. 1.

FIG. 2 is a block diagram illustrating an example of a corpus 202 analyzed by the system 102 of FIG. 1. Corpus 202 includes several documents 204, 206, 208, 210 and 212. For example, a document may be a book, a report, a paper, or any document that is at least partially-text based. A query search phrase includes two or more words.

Parser 116 parses the content of each document in corpus 202 for the query search phrase. For illustration purposes, the query search phrase appears one time in document 204, six times in document 206, one time in document 208, two times in document 210, and none in document 212.

Analyzer 118 determines the probability of occurrence and frequency of query search phrase in the general corpus 202. For example, the query search phrase has a relatively low frequency of occurrence in corpus 202 relative to document 206. That query search phrase would be thus considered a SIP.

Figure 3:
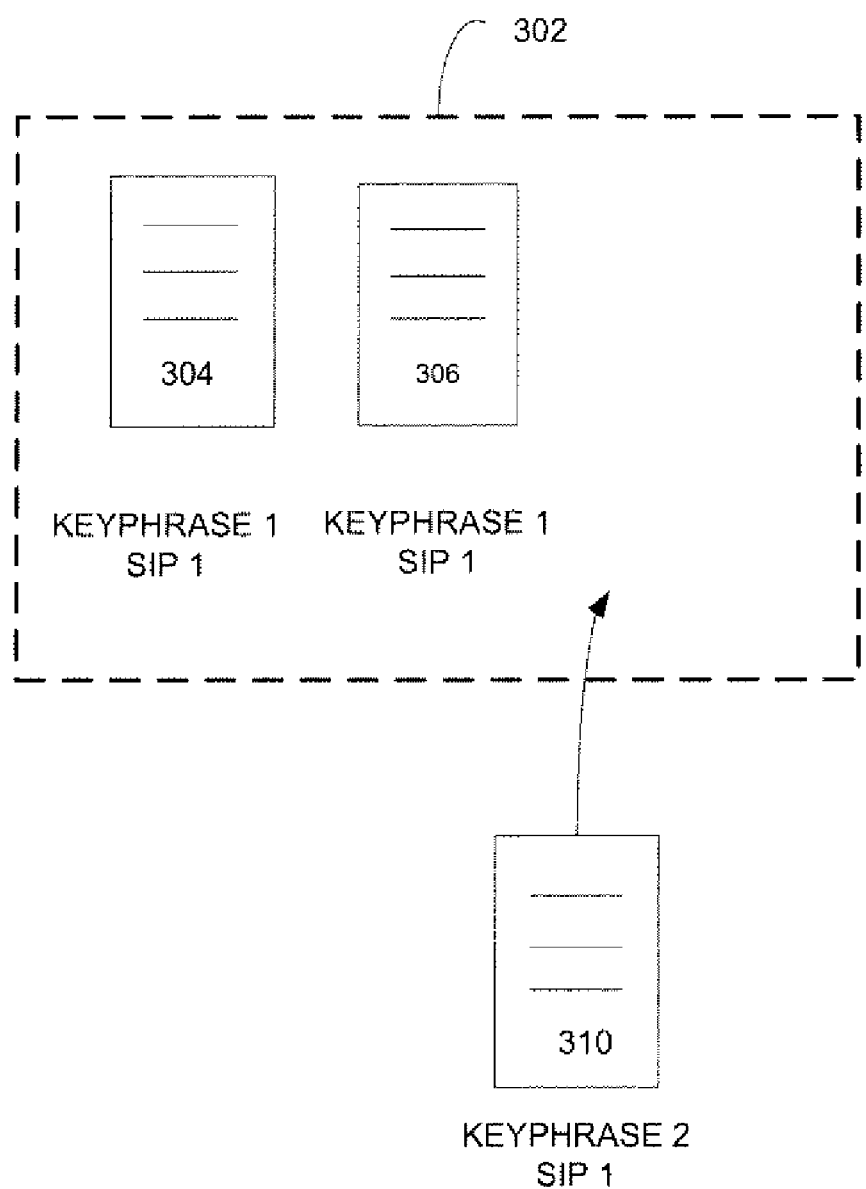
FIG. 3 is a block diagram illustrating one embodiment of categorizing documents in a corpus analyzed by the system of FIG. 1.

FIG. 3 is a block diagram illustrating one embodiment of categorizing documents by the system of FIG. 1. For illustration purposes, each document has been parsed and a key phrase and SIP is associated with each document. For example, document 304 includes key phrase 1, and SIP 1. Document 306 includes key phrase 1, and SIP 1.

The system of FIG. 1 groups documents having common key phrases together. In this example, documents 304, 306 are grouped together because they share the common SIP 1.

Other documents may be added to group 302. For example, document 310 may be added to group 302 because it shares the same SIP (SIP 1) even though it has a different key phrase (key phrase 2).

Figure 4:
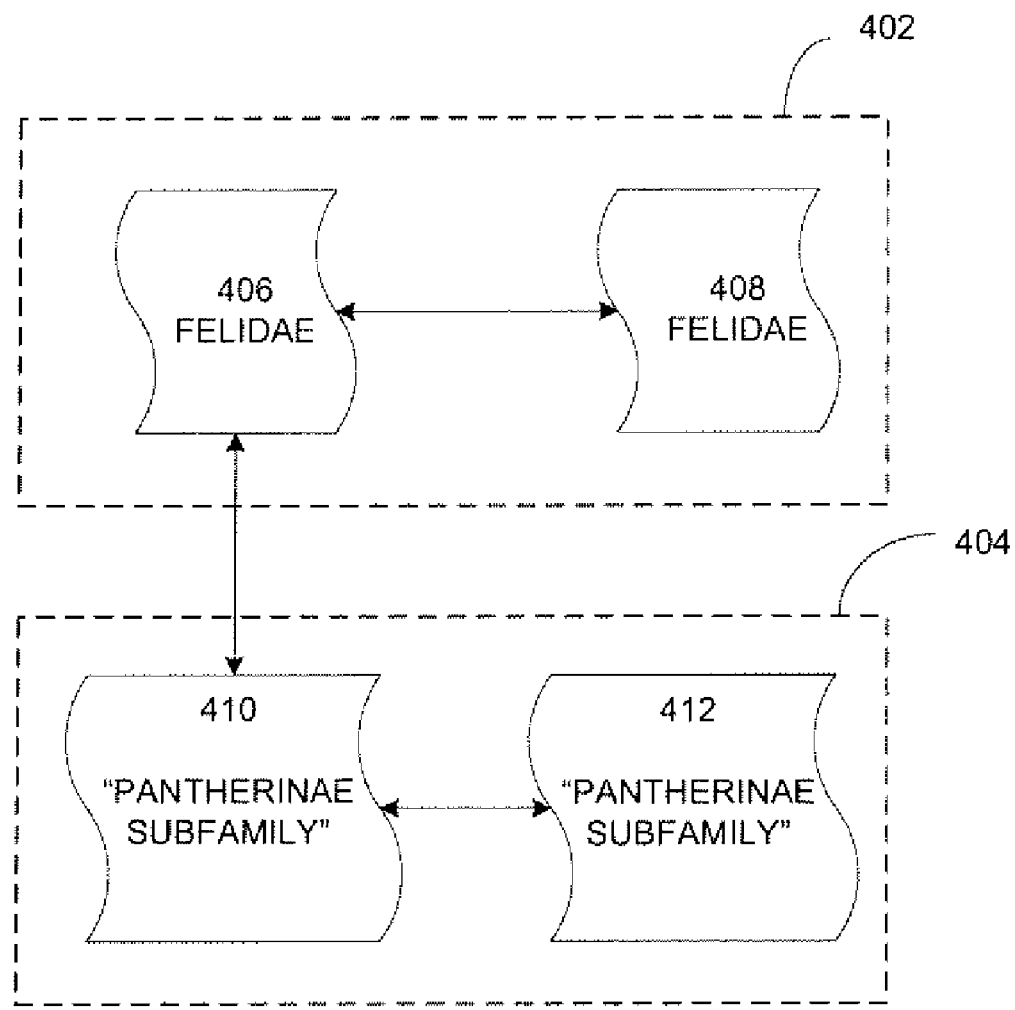
FIG. 4 is a block diagram illustrating one embodiment of correlating categorized documents in a corpus analyzed by the system of FIG. 1.

FIG. 4 is a block diagram illustrating one embodiment of correlating categorized documents in a corpus analyzed by the system of FIG. 1. Groups 402 and 404 each include documents that share common SIPs. For example, group 402 includes documents 406, 408 that share "family Felidae" as SIP. Group 404 includes documents 410, 412 that share "Pantherinae subfamily" as SIP.

The correlation between the SIP "family Felidae" and SIP "Pantherinae subfamily" may be strong enough that documents 406, 408 with SIP "family Felidae" may be categorized with documents 410, 412 with the SIP "Pantherinae subfamily", even if documents 410, 412 do not contain the SIP "Pantherinae subfamily".

Figure 5:
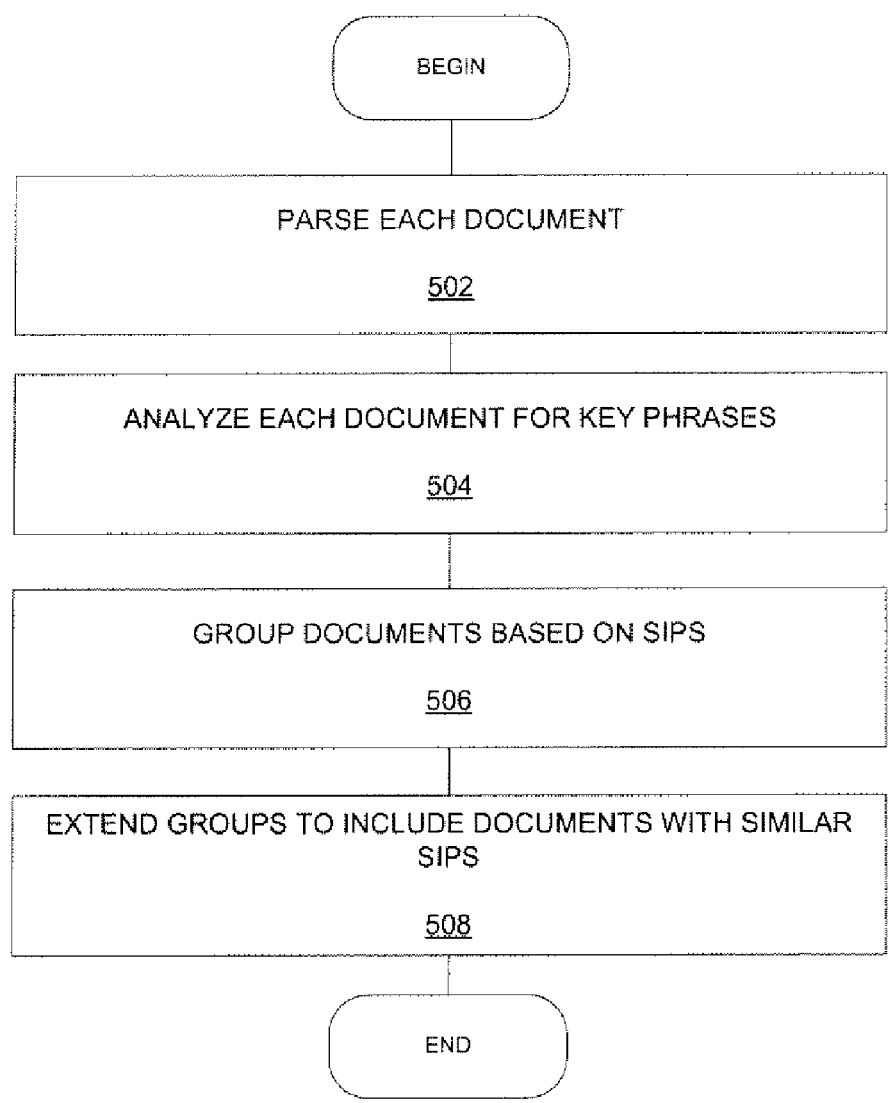
FIG. 5 is a flow diagram illustrating one embodiment of a method for analyzing documents.

FIG. 5 is a flow diagram illustrating one embodiment of a process 500 for analyzing documents. In one embodiment, process 500 preprocesses a reference document by removing all punctuation and lower casing each character in the reference document. In an alternative embodiment, process 500 replaces words, characters, and/or symbols with equivalent words, characters, and/or symbols. For example and in one embodiment, process 500 replaces the words "propel" with "row" and "water craft" with "boat." In this example, the phrase "propel, propel, propel, your water craft" is changed into "row, row, row, your boat." In a further embodiment, process 500 preprocesses the reference document to enhance the statistical features of the reference document. This is described in further detail in a co-pending U.S. patent application Ser. No. 12/395,319, filed Feb. 27, 2009, entitled "Preprocessing Text to Enhance Statistical Features," and assigned to a common assignee of the present application.

At 502, a parser parses each documents for phrases. At 504, a statistical analysis analyzes each document for key phrases (phrases that occur significantly more in a document relative to other phrases in the same document).

At 506, documents are sorted into distinct group based on shared SIPs. At 508, a document with a similar SIP may be included in the group even though its key phrase does not match the key phrases of the documents in the group.

In one embodiment, the most common representative SIP from a set of grouped documents may be used to name the set of grouped documents.

Figure 6:
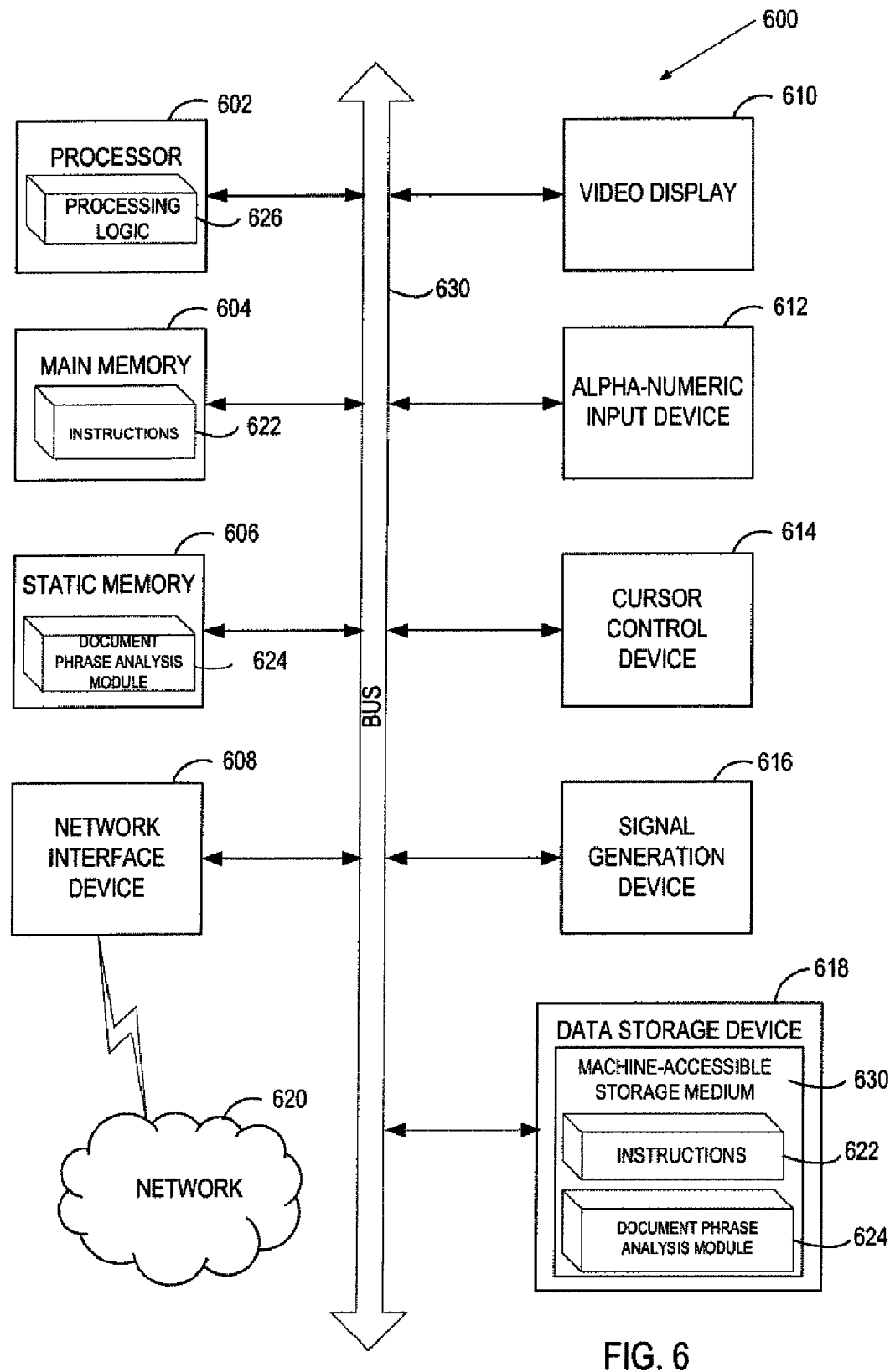
FIG. 6 is a block diagram illustrating an example of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-accessible storage medium 630 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-accessible storage media. The software 622 may further be transmitted or received over a network 620 via the network interface device 608.

The computer-accessible storage medium 630 may also be used to store the related search term engine 624 as presently described. The related search term engine 624 may also be stored in other sections of computer system 600, such as static memory 606.

While the computer-accessible storage medium 630 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the computer system and that cause the computer system to perform any one or more of the methodologies of the present invention. The term "computer-accessible storage medium"

shall accordingly be taken to include, but not be limited to, solid-state memories, optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   parsing, by a server computing device, each document of a corpus of documents to determine phrases found in each of the documents;
   analyzing, by the server computing device, each determined phrase with respect to each document to determine a frequency of occurrence of the phrase in the document relative to a frequency of occurrence of the phrase in the corpus;
   identifying, by the server computing device, documents that comprise a same statistically improbable phrase, wherein the statistically improbably phrase is one of the determined phrases having both of:
      a probability of occurrence in a document of the corpus of documents that is higher than probability of occurrence of other phrases in the document; and
      a probability of occurrence in the corpus of documents that is lower than probability of occurrence of other phrases in the corpus of documents; and
   grouping, by the server computing device, the identified documents that comprise the statistically improbable phrase into a single group of documents.

2. The computer-implemented method of claim 1 further comprising:
   adding to the single group of documents, those documents with a similar statistically improbable phrase.

3. The computer-implemented method of claim 2 wherein one or more of the documents with the similar statistically improbable phrase are not associated with the key phrase.

4. The computer-implemented method of claim 1 wherein the statistically improbable phrase is determined by:
   performing a statistical analysis to determine a frequency of occurrence of a phrase in a document relative to a set of documents; and
   associating the phrase with one or more documents that have a lower probability of occurrence of the phrase in the set of documents.

5. The computer-implemented method of claim 1 further comprising:
   sorting one or more documents based on one or more statistically improbable phrases.

6. The computer-implemented method of claim 1 further comprising:
   adjusting a degree of correlation between documents in a group based on the number of shared key phrases.

7. The computer-implemented method of claim 1 further comprising:
   displaying the different groups of the one or more documents in response to a search query phrase.

8. A server comprising:
   a processing device;
   a memory coupled to the processing device, the memory storing a corpus of documents; and
   a phrase analysis engine executable from the memory by the processing device, the phrase analysis engine comprising:
      a parser configured to parse each document of the corpus of documents to determine phrases found in each of the documents;
      an analyzer configured to:
         analyze each determined phrase with respect to each document to determine a frequency of occurrence of the phrase in the document relative to a frequency of occurrence of the phrase in the corpus; and identify documents that comprise a same statistically improbable phrase, wherein the statistically improbably phrase is one of the determined phrases having both of:
- a probability of occurrence in a document of the corpus of documents that is higher than probability of occurrence of other phrases in the document; and
- a probability of occurrence in the corpus of documents that is lower than probability of occurrence of other phrases in the corpus of documents; and a categorizer configured to group the identified documents that comprise the statistically improbable phrase into a single group of documents.

9. The server of claim 8 wherein the phrase analysis engine further comprises a correlater configured to add to the single group of documents, those documents with a similar statistically improbable phrase.

10. The server of claim 9 wherein one or more of the documents with the similar statistically improbable phrase are not associated with the key phrase.

11. The server of claim 8 wherein the statistically improbable phrase is determined by performing a statistical analysis to determine a frequency of occurrence of a phrase in a document relative to a set of documents, and associating the phrase with one or more documents that have a lower probability of occurrence of the phrase in the set of documents.

12. The server of claim 8 wherein the categorizer is further configured to sort one or more documents based on one or more statistically improbable phrases.

13. The server of claim 8 wherein the categorizer is further configured to adjust a degree of correlation between documents in a group based on the number of shared key phrases.

14. The server of claim 8 wherein the server is coupled to a display, the display configured to display the different groups of the one or more documents in response to a search query phrase.

15. A non-transitory computer-accessible storage medium including data that, when accessed by a computer system, cause the computer system to perform a method comprising:
parsing, by a server computing device, each document of a corpus of documents to determine phrases found in each of the documents;
analyzing, by the server computing device, each determined phrase with respect to each document to determine a frequency of occurrence of the phrase in the document relative to a frequency of occurrence of the phrase in the corpus;
identifying, by the server computing device, documents that comprise a same statistically improbable phrase, wherein the statistically improbably phrase is one of the determined phrases having both of:
- a probability of occurrence in a document of the corpus of documents that is higher than probability of occurrence of other phrases in the document; and
- a probability of occurrence in the corpus of documents that is lower than probability of occurrence of other phrases in the corpus of documents; and grouping, by the server computing device, the identified documents that comprise the statistically improbable phrase into a single group of documents.

16. The non-transitory computer-accessible storage medium of claim 15 wherein the method further comprises:
adding to the single group of documents, those documents with a similar statistically improbable phrase.

17. The non-transitory computer-accessible storage medium of claim 16 wherein one or more of the documents with the similar statistically improbable phrase are not associated with the key phrase.

18. The non-transitory computer-accessible storage medium of claim 15 wherein the statistically improbable phrase is determined by:
performing a statistical analysis to determine a frequency of occurrence of a phrase in a document relative to a set of documents; and
associating the phrase with one or more documents that have a lower probability of occurrence of the phrase in the set of documents.

19. The non-transitory computer-accessible storage medium of claim 15 wherein the method further comprises:
sorting one or more documents based on one or more statistically improbable phrases.

20. The non-transitory computer-accessible storage medium of claim 15 wherein the method further comprises:
adjusting a degree of correlation between documents in a group based on the number of shared key phrases.

* * * * *